United States Patent
Knight et al.

(10) Patent No.: US 10,808,733 B2
(45) Date of Patent: Oct. 20, 2020

(54) OPEN CENTER TO OPEN CENTER LOAD SENSE CONVERSION VALVE AND HYDRAULIC SYSTEMS THEREWITH

(71) Applicant: DEERE & COMPANY, Moline, IL (US)

(72) Inventors: Jesse Knight, Cedar Falls, IA (US); Gabriel Stauffer, Waverly, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/293,037

(22) Filed: Mar. 5, 2019

(65) Prior Publication Data
US 2020/0284271 A1 Sep. 10, 2020

(51) Int. Cl.
| | |
|---|---|
| *F15B 11/16* | (2006.01) |
| *B62D 5/07* | (2006.01) |
| *B62D 5/12* | (2006.01) |
| *B62D 5/06* | (2006.01) |
| *F15B 13/02* | (2006.01) |
| *E02F 9/22* | (2006.01) |

(Continued)

(52) U.S. Cl.
CPC ............ *F15B 11/162* (2013.01); *B62D 5/062* (2013.01); *B62D 5/07* (2013.01); *B62D 5/075* (2013.01); *B62D 5/12* (2013.01); *E02F 9/2267* (2013.01); *F15B 11/05* (2013.01); *F15B 13/022* (2013.01); *F16H 61/0021* (2013.01); *F15B 2211/605* (2013.01); *F15B 2211/7142* (2013.01)

(58) Field of Classification Search
CPC .. B62D 5/07; B62D 5/075; B62D 5/12; E02F 9/2267; F15B 11/162

USPC .......................................................... 60/442
See application file for complete search history.

(56) References Cited

U.S. PATENT DOCUMENTS

| 6,089,248 A | 7/2000 | Rost |
|---|---|---|
| 9,200,647 B2 | 12/2015 | Jadhav |

(Continued)

OTHER PUBLICATIONS

Cirus Controls, Brooklyn Park, MN; www.ciruscontrols.com; Literature Title: "Converting Between Open Center and Load Sense Cirus Manifold"; Dated: Oct. 11, 2010; Revision 1.1; 2 pages.

(Continued)

*Primary Examiner* — Thomas E Lazo
*Assistant Examiner* — Daniel S Collins
(74) *Attorney, Agent, or Firm* — Taft Stettinius & Hollister LLP; Stephen F. Rost

(57) ABSTRACT

An open center (OC)-open center load sense (OCLS) conversion valve and hydraulic circuits therewith configured to control flow from a hydraulic pump to multiple hydraulic functions. The conversion valve includes cartridge, load sense, pump, first function supply, first function return, and downstream ports. When an OC cartridge is inserted in the cartridge port, regardless of load sense, the pump and first function supply ports are connected and the first function return and downstream ports are connected. When an OCLS cartridge is inserted in the cartridge port and load sense is detected, the pump and first function supply ports are connected and the first function return and downstream ports are connected. When an OCLS cartridge is inserted in the cartridge port and load sense is not detected, the pump, first function return and downstream ports are connected.

20 Claims, 7 Drawing Sheets

(51) Int. Cl.
*F15B 11/05* (2006.01)
*F16H 61/00* (2006.01)

(56) References Cited

U.S. PATENT DOCUMENTS

2016/0376769 A1   12/2016  Mori
2017/0306989 A1*  10/2017  Coolidge .............. F15B 11/161

OTHER PUBLICATIONS

Literature/Catalog No. 672100005: "Typical Series 20 Stack Valve Assembly" and "Example Series 20 Stack Valve Open Center Hydraulic Circuit With Optional Power Beyond"; Rev G ECN-221623 dated Jan. 25, 2012; 2 pages.
Cirus Controls, Brooklyn Park, MN; www.ciruscontrols.com; "Converting Between Open Center and Load Sense Cirus Manifold"; https://certifiedcirus.com/wp-content/uploads/2017/03/Technote-10-006.1-Convert-manifold-between-Open-center-and-Load-Sense-1.pdf; dated: Oct. 11, 2010; Revision 1.1; 2 pages.
Literature/Catalog No. 672100005: "Typical Series 20 Stack Valve Assembly" and "Example Series 20 Stack Valve Open Center Hydraulic Circuit With Optional Power Beyond"; Rev G ECN-221623 dated Jan. 25, 2012; http://www. princehyd.com/Portals/0/valves/Series20InstS.pdf; 2 pages.
Muncie Power Products, Inc.; "Stand Alone Spreader: Installation Instructions and Operator's Manual"; HF51912-09; Muncie, IN; https://www.munciepower.com/cms/files/Products/Literature/Documents/Install/IN16-01.pdf; dated 2009; 12 pages.

* cited by examiner

US 10,808,733 B2

OPEN CENTER TO OPEN CENTER LOAD SENSE CONVERSION VALVE AND HYDRAULIC SYSTEMS THEREWITH

FIELD OF THE DISCLOSURE

The present disclosure relates to hydraulic systems, and more particularly to conversion valves that enable conversion of a hydraulic circuit between open center and open center load sense circuit types.

BACKGROUND

Open Center (OC) circuits and Open Center Load Sense (OCLS) circuits (also called Pressure Compensated circuits) are both established circuit types that are each built with dedicated valves for one circuit type or the other. Conversion of a hydraulic circuit between OC and OCLS configurations presently requires making significant hardware changes.

It would be desirable to be able to convert a hydraulic circuit from an OC configuration to an OCLS configuration, or from an OCLS configuration to an OC configuration without requiring significant hardware changes. This can also enable the update of utility tractors with traditional open center hydraulics to steering systems that allow integrated vehicle guidance with less labor and expense.

SUMMARY

An open center (OC)-open center load sense (OCLS) conversion valve is disclosed that is configured to control flow from a hydraulic pump to first and second hydraulic functions. The OC-OCLS conversion valve includes a cartridge port, a load sense port, a pump supply port, a first function supply port, a first function return port, and a first downstream port. The cartridge port is configured to hold one of an OC cartridge and an OCLS cartridge. The pump supply port is configured to connect to the hydraulic pump. The first function supply port is configured to connect to a supply line connected to the first hydraulic function, and the first function return port is configured to connect to a return line connected to the first hydraulic function. The first downstream port is configured to connect to the second hydraulic function. When the OC cartridge is inserted in the cartridge port, regardless of any flow through the load sense port, flow that enters the OC-OCLS conversion valve through the pump supply port is directed to the first function supply port and flow that enters the OC-OCLS conversion valve through the first function return port is directed to the first downstream port. When the OCLS cartridge is inserted in the cartridge port and flow through the load sense port indicates a demand from the first hydraulic function, flow that enters the OC-OCLS conversion valve through the pump supply port is directed to the first function supply port and flow that enters the OC-OCLS conversion valve through the first function return port is directed to the first downstream port. When the OCLS cartridge is inserted in the cartridge port and flow through the load sense port does not indicate a demand from the first hydraulic function, flow that enters the OC-OCLS conversion valve through the pump supply port and flow that enters the OC-OCLS conversion valve through the first function return port is directed to the first downstream port. The first hydraulic function can be a steering circuit, and the second hydraulic function can be a transmission control circuit.

The OC-OCLS conversion valve can also include one or more additional downstream ports, wherein any flow directed to the first downstream port is also directed to the additional downstream ports. The OC-OCLS conversion valve can also include an internal load sense flow path hydraulically connected to the load sense port and the first function supply port.

The OCLS cartridge, when inserted in the cartridge port, can cause the OC-OCLS conversion valve to function as a priority valve, or an unloading valve, or another type of valve that supports load sense operation. When a first OCLS cartridge is inserted in the cartridge port, the OC-OCLS conversion valve can function as a priority valve; and when a second OCLS cartridge is inserted in the cartridge port, the OC-OCLS conversion valve functions as an unloading valve.

A hydraulic circuit is disclosed that includes a hydraulic pump, a first hydraulic function, a second hydraulic function, and an OC-OCLS conversion valve configured to control flow from the hydraulic pump to the first and second hydraulic functions. The OC-OCLS conversion valve includes a cartridge port, a load sense port, a pump supply port, a first function supply port, a first function return port, and a downstream port. The cartridge port is configured to hold one of an OC cartridge and an OCLS cartridge. The load sense port is configured to connect to a load sense line for the first hydraulic function. The pump supply port is configured to connect to the hydraulic pump. The first function supply port is configured to connect to a supply line for the first hydraulic function. The first function return port is configured to connect to a return line for the first hydraulic function. The downstream port is configured to connect to a supply line for the second hydraulic function. When the OC cartridge is inserted in the cartridge port, regardless of any flow through the load sense port, flow that enters the OC-OCLS conversion valve through the pump supply port is directed to the first function supply port and flow that enters the OC-OCLS conversion valve through the first function return port is directed to the downstream port. When the OCLS cartridge is inserted in the cartridge port and flow through the load sense port indicates a demand from the first hydraulic function, flow that enters the OC-OCLS conversion valve through the pump supply port is directed to the first function supply port and flow that enters the OC-OCLS conversion valve through the first function return port is directed to the downstream port. When the OCLS cartridge is inserted in the cartridge port and flow through the load sense port does not indicate a demand from the first hydraulic function, flow that enters the OC-OCLS conversion valve through the pump supply port and flow that enters the OC-OCLS conversion valve through the first function return port is directed to the downstream port.

The first hydraulic function can be a steering circuit, and the second hydraulic function can be a transmission control circuit. The steering circuit can include a manual steering circuit and an automatic driving system. The steering circuit can also include a steering cylinder, where the manual steering circuit and the automatic driving system are hydraulically coupled in parallel between the OC-OCLS conversion valve and the steering cylinder. The manual steering circuit can include a hydro-mechanical steering valve, and the automatic driving system can include an electrohydraulic steering valve, where the hydro-mechanical steering valve and the electrohydraulic steering valve are hydraulically coupled in parallel between the OC-OCLS conversion valve and the steering cylinder.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
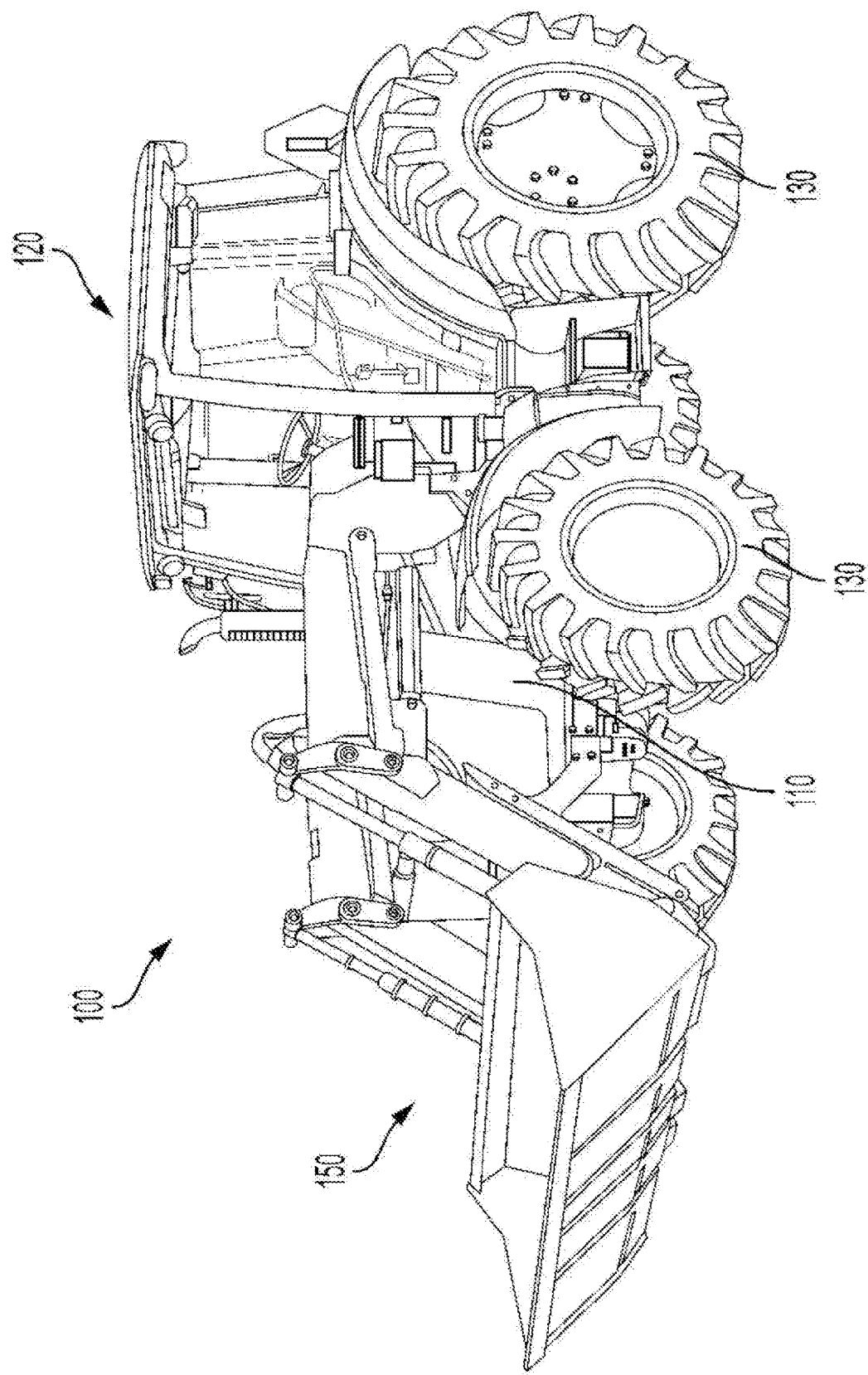
FIG. 1 illustrates an exemplary embodiment of a vehicle that includes an OC-OCLS conversion valve.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Open Center (OC) circuits and Open Center Load Sense (OCLS) circuits (also called Pressure Compensated circuits) are both established circuit types that are each built with dedicated valves for one circuit type or the other so they are not configurable without changing significant hardware. An Open Center-Open Center Load Sense Conversion Valve would allow a hydraulic circuit to be configured as either Open Center (OC) or Open Center Load Sense (OCLS) with significantly less hardware changes. The OC-OCLS Conversion Valve is configurable to either an OC or OCLS circuit type depending on the type of cartridge installed in the conversion valve manifold.

The Open Center-Open Center Load Sense Conversion Valve could be used in many different hydraulic circuits that use closed center valves, for example steering hydraulic circuits, suspension hydraulic circuits and others. An OCLS steering circuit allows close center steering valves to be configurable with a fixed displacement hydraulic pump which allows integrated tractor guidance systems to be installed on the tractor.

In today's distributed and specialized manufacturing environment, vehicles and other large systems may have subsystems that are manufactured at different locations and then assembled at another location. For example, transmissions may be assembled in a transmission factory at one location, and then shipped to a vehicle assembly factory at another location. The hydraulic pump for steering circuits is typically installed at the transmission factory and either has an OC or OCLS configuration. This requires the vehicle assembly factory to keep inventory of two different types of transmissions, OC configured transmissions and OCLS configured transmissions. This dual inventory increases costs and also puts greater emphasis on accurate forecasting of demand for tractors of each configuration. The OC-OCLS conversion valve would allow for either hydraulic pump configuration to be installed at the transmission factory and then the vehicle assembly factory could configure the hydraulic circuit of the transmission for the desired steering circuit option during vehicle assembly. This would allow for fewer transmission configurations at the transmission factory, less inventory of transmissions at the vehicle assembly factory, and less emphasis on accurate forecasting while still being able to offer the desired optionality at the vehicle assembly factory.

In addition, the Open Center-Open Center Load Sense Conversion Valve would allow for simplified field conversion of hydraulic circuits by replacing an open center type cartridge with an open center load sense type cartridge. Changing the steering circuit may also require updating the steering valve to a close center steering valve.

The Open Center-Open Center Load Sense Conversion Valve concept could be used to convert any Open Center hydraulic circuit to an Open Center Load Sense circuit. For example, a GPS controlled steering system may require an OCLS circuit, while a standard manual steering system may use an OC circuit. An OC-OCLS conversion valve could be packaged in any manifold design and used on any Open Center tractor wanting to add an integrated GPS controlled steering system. Additionally, the concept could be applied to open center steering circuits of other vehicle types.

FIG. 1 illustrates an exemplary embodiment of a vehicle 100, in this example a tractor, that includes an engine compartment 110 that holds an engine, an operator cab 120, front and rear wheels 130 and an implement 150. The wheels 130 support the engine compartment 110 and operator cab 120 above the ground. In alternative tractor embodiments, tracks can be used instead of wheels 130. The implement 150 hydraulically powered and controlled by the tractor 100. The operator cab 120 includes controls for an operator to control the tractor 100, including the engine, wheels 130 and other components of the tractor 100 and can include controls for the operator to control the implement 150. The engine provides power to turn the wheels 130 and propel the tractor 100. At least the front wheels 130 can be steerable to steer the tractor 100, and alternatively both the front and rear wheels 130 can be steerable to steer the tractor 100. The operator cab 120 provides the operator with a view of the area being worked by the tractor 100.

Figure 2:
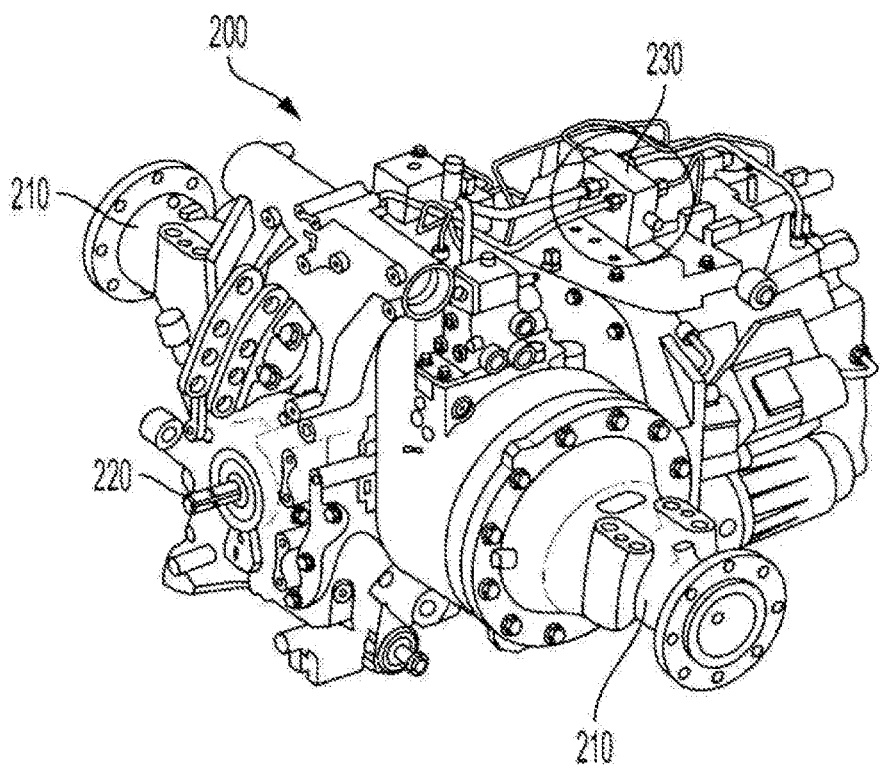
FIG. 2 illustrates an exemplary transaxle that includes an OC-OCLS conversion valve.

FIG. 2 illustrates an exemplary transaxle 200 which includes transmission and axle components and is generally in the engine compartment 110 of the vehicle 100. The transaxle 200 includes the rear axle 210, a power takeoff unit (PTO) 220 and an OC-OCLS conversion valve 230. The rear wheels 130 are coupled to the rear axle 210. The hydraulic implement 150 can be coupled to the PTO 220.

Figure 3A:
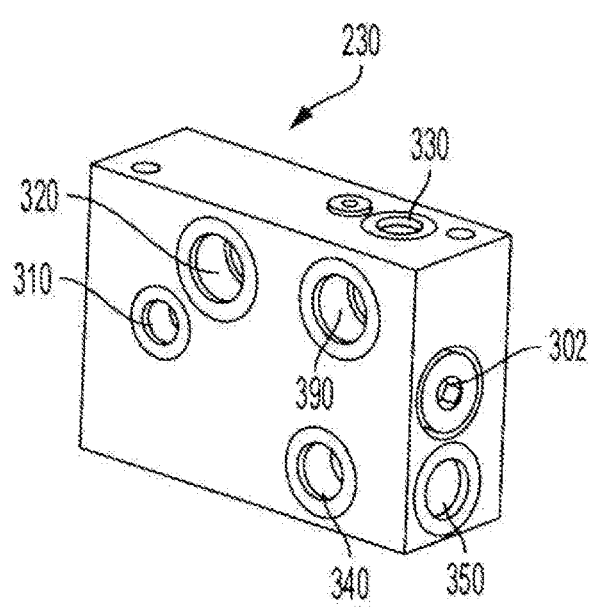
FIGS. 3A and 3B illustrate left and right side views of an exemplary OC-OCLS conversion valve manifold.
Figure 3B:
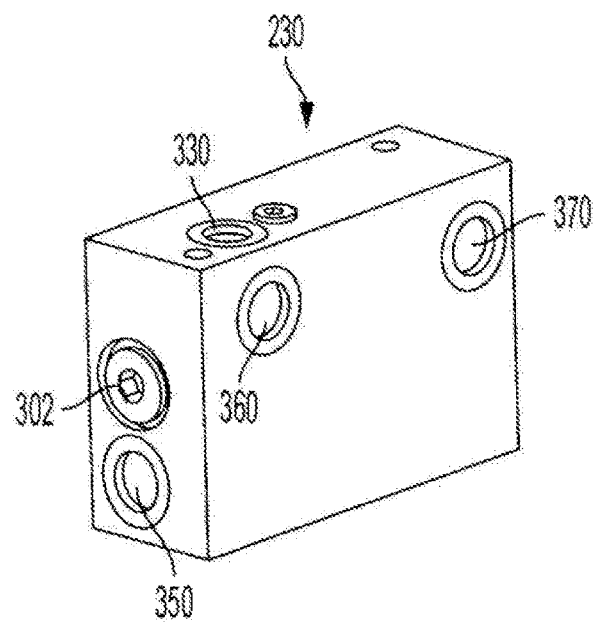

FIG. 3A illustrates a left-side view and FIG. 3B illustrates a right side view of an exemplary OC-OCLS conversion valve 230. The OC-OCLS conversion valve 230 includes multiple hydraulic coupling locations and a cartridge plug 302 that can be replaced by the desired cartridge. The multiple hydraulic coupling locations include a steering load sense port 310, a transmission system pressure port 320, a diagnostic port 330, a pump supply port 340, a steering supply port 350, a transmission shift valve supply port 360, a transmission pressure transducer port 370 and a steering return port 390. The ports can be standard metric O-ring type ports per ISO 6149-1.

Figure 4:
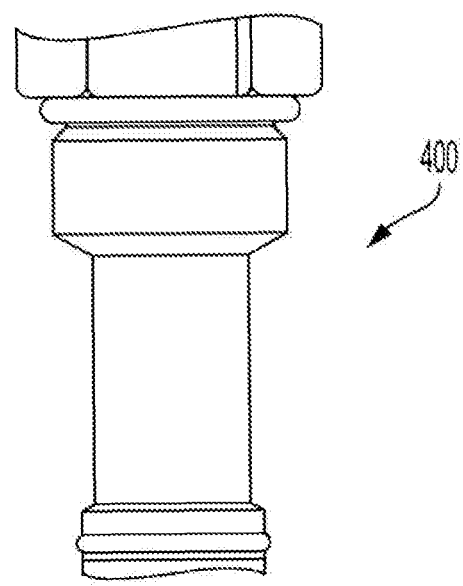
FIG. 4 illustrates an exemplary open center (OC) cartridge.
Figure 5:
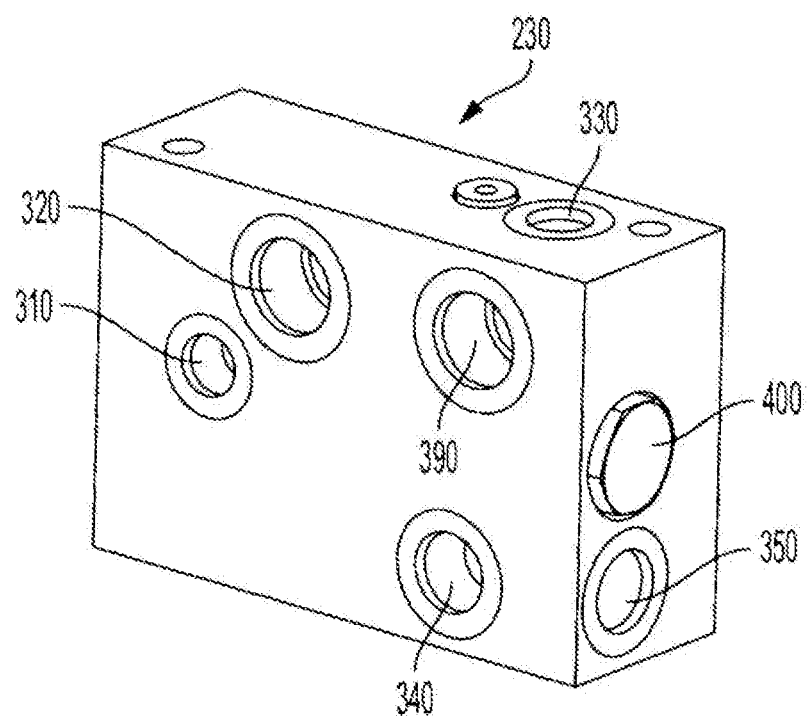
FIG. 5 illustrates an exemplary OC-OCLS conversion valve in an OC configuration.

FIG. 4 illustrates an exemplary open center (OC) cartridge 400, and FIG. 5 illustrates the OC-OCLS conversion valve 230 in the OC configuration with the OC cartridge 400 inserted in place of the cartridge plug 302. In the OC configuration, the transmission system pressure port 320 connects flow from the steering return to the transmission control circuit 660. The diagnostic port 330 provides transmission pressure. The pump supply port 340 connects supply oil from the steering pump to the OCLS conversion valve 230. In the OC configuration, the steering supply port 350 connects supply oil to the steering valve. The shift valve supply port 360 connects supply oil from downstream of the priority valve to the transmission shift valve. The steering return port 390 connects return flow from the steering valve.

The OC-OCLS conversion valve 230 with the OC cartridge 400 installed can be described as a blanking valve which creates a singular flow path such that oil entering the OC-OCLS conversion valve 230 through the pump supply port 340 is directed to exit the OC-OCLS conversion valve 230 through the steering supply port 350 to supply the steering valve, and oil returning from the steering valve to the OC-OCLS conversion valve 230 through the steering return port 390 is routed to the various downstream consumers through the transmission system pressure port 320 and the shift valve supply port 360.

Figure 6:
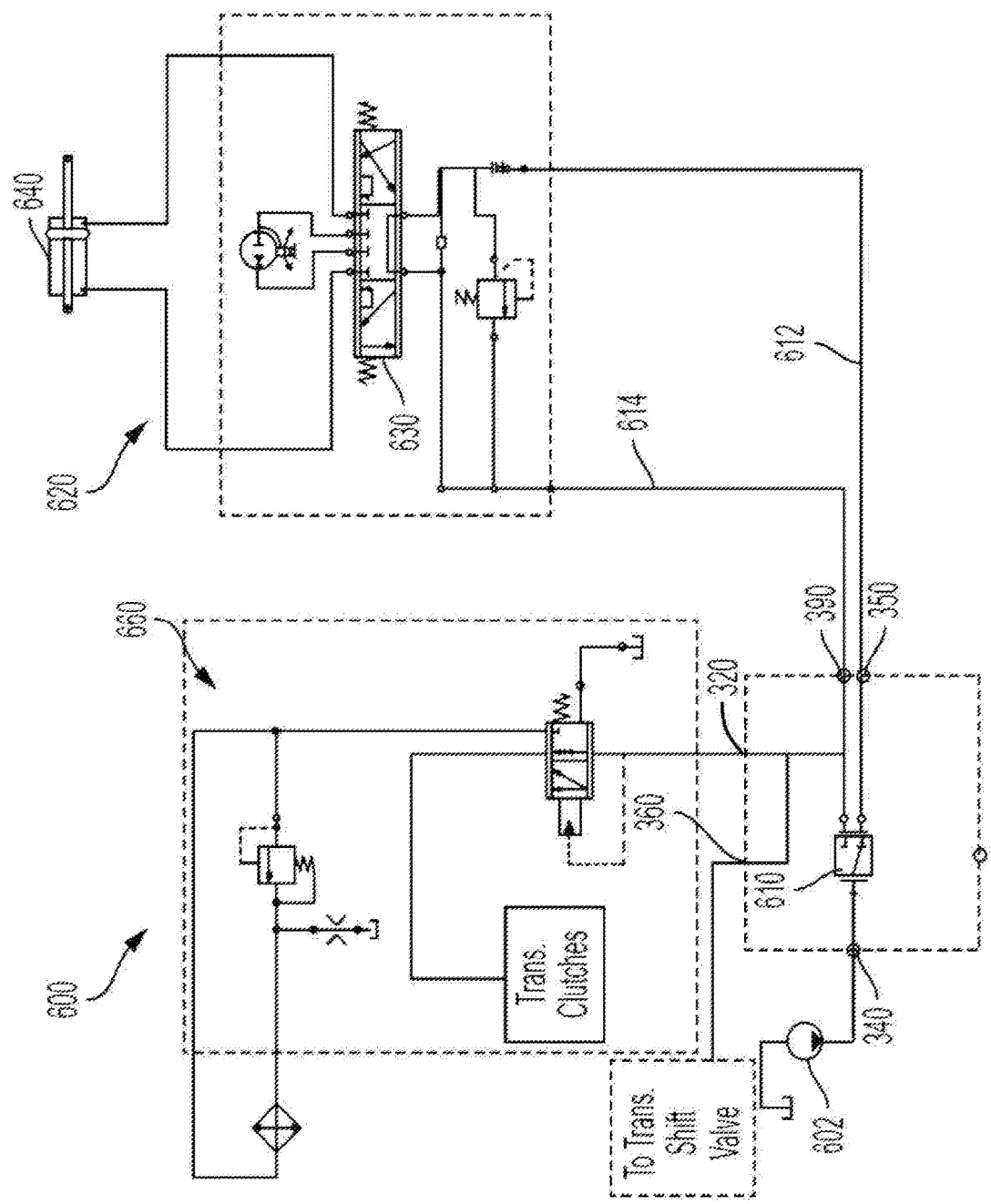
FIG. 6 illustrates an exemplary steering circuit for a vehicle with the OC cartridge inserted in the OC-OCLS conversion valve.

FIG. 6 illustrates an exemplary steering and transmission hydraulic circuit 600 for the vehicle 100 with the OC cartridge 400 inserted in the OC-OCLS conversion valve 230 putting it in the OC configuration. The OC-OCLS conversion valve 230 in the OC configuration is represented by valve assembly 610. The steering and transmission hydraulic circuit 600 includes a steering pump 602, the OC-OCLS conversion valve 610 (in the OC configuration), a steering valve supply line 612, a steering valve return line 614, a manual steering circuit 620, a steering valve 630, a steering cylinder 640 and a transmission control circuit 660. The steering pump 602 provides flow to the pump supply port 340 of the OC-OCLS manifold 610 which directs flow to a steering valve supply line 612 through the steering supply port 350 of the OC-OCLS manifold 610. The steering valve supply line 612 provides flow to the steering circuit 620 which includes an open center steering valve 630 and a steering cylinder 640. The steering valve 630 controls flow to the steering cylinder 640 if there is an operator input to the steering valve. Otherwise, the flow passes through the neutral path of the steering valve 630 and returns flow through a steering valve return line 614 to the steering return port 390 of the OC-OCLS valve 610. Return flow through the steering return port 390 is directed to the transmission system pressure port 320 and the shift valve supply port 360 which provide flow to the transmission control circuit 660, the transmission shift valve and possibly other downstream consumers.

A typical manual steering system can use an Open Center hydraulic circuit 600 with a hydro-mechanical steering valve 630 where all the hydraulic steering components are in series. An automatic driving system can have an electrohydraulic steering valve plumbed in parallel to the manual hydro-mechanical steering valve 630 which cannot be accomplished with an Open Center hydraulic circuit 600, but can be accomplished with an Open Center Load Sense hydraulic circuit 700. The OC-OCLS conversion manifold 230 enables the installation of a priority valve 500 to convert the hydraulic circuit from Open Center to Open Center Load Sense, which enables the vehicle to be configured for either an OC or OCLS when the transmission is assembled to the vehicle. The assembly factory can install the appropriate cartridge 400 or 500 to configure the tractor to the desired hydraulic system. This enables manufacturing flexibility for an automatic drive system. Additionally, the OC-OCLS conversion manifold 230 simplifies the service solution to update a tractor from a OC system to a OCLS system to add the automated drive system after a customer purchases the tractor.

The OC-OCLS conversion manifold 230 can also reduce setup time for transmission production test which may require temporary plumbing to connect the steering pump 602 to the transmission circuit 660. The OC-OCLS conversion manifold 230 can be designed so that when the cartridge plug 302 is installed, oil is routed to the transmission circuit 660 at the transmission factory without the use of temporary plumbing.

Figure 7:
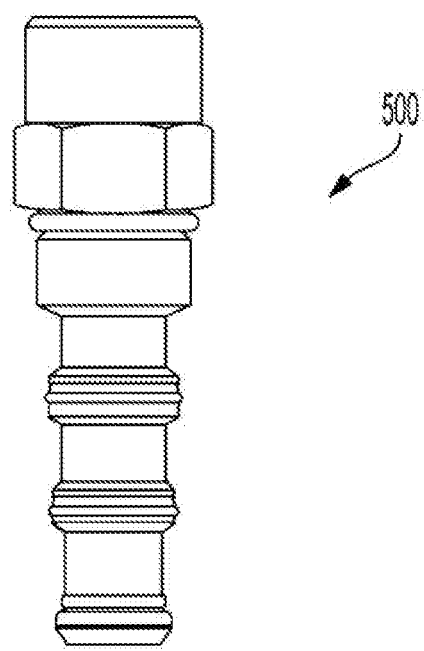
FIG. 7 illustrates an exemplary open center load sense (OCLS) cartridge.
Figure 8:
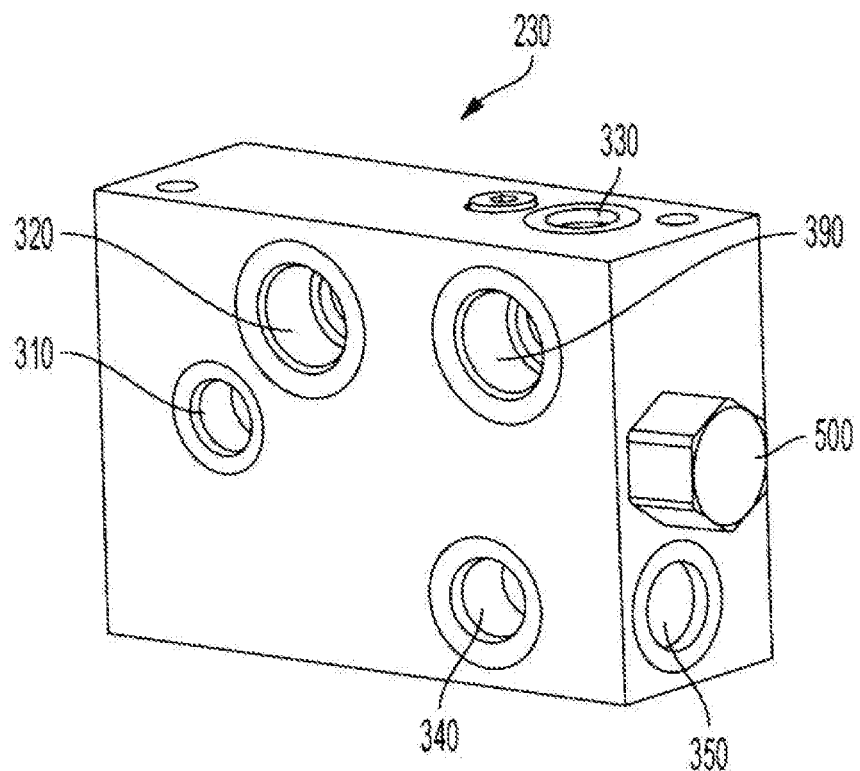
FIG. 8 illustrates an exemplary OC-OCLS conversion valve in an OCLS configuration.

FIG. 7 illustrates an exemplary open center load sense (OCLS) cartridge 500, and FIG. 8 illustrates the OC-OCLS conversion valve 230 in the OCLS configuration with the OCLS cartridge 500 inserted in place of the cartridge plug 302. In the OCLS configuration, the steering load sense port 310 connects the load sense of the steering valve and the auto-steering valve to the priority valve. In the OCLS configuration, the transmission system pressure port 320 connects flow from the priority valve to the transmission control circuit 660. The diagnostic port 330 provides transmission pressure. The pump supply port 340 connects supply oil from the steering pump to the OCLS conversion valve 230. In the OCLS configuration, the steering supply port 350 connects supply oil to both the steering valve and the auto-steering valve. The shift valve supply port 360 connects supply oil from the priority valve to the transmission shift valve. In the OCLS configuration, the steering return port 390 connects return flow from the steering valve and the auto-steering valve.

The OC-OCLS conversion valve 230 with the OCLS cartridge 500 installed can be configured as a priority valve which meters oil from the pump supply port 340 to either the steering supply port 350 or to various downstream consumers through the steering load sense port 310, the transmission pressure port 320 and the shift valve supply port 360 based on the load sense signal communicated from the steering valves through the steering load sense port 310. When there is demand from the steering system, the priority valve 230 will shift to route oil through the steering supply port 350 to a closed center steering valve or auto steering valve otherwise the oil is directed to the steering load sense port 310, the transmission pressure port 320 and the shift valve supply port 360.

Figure 9:
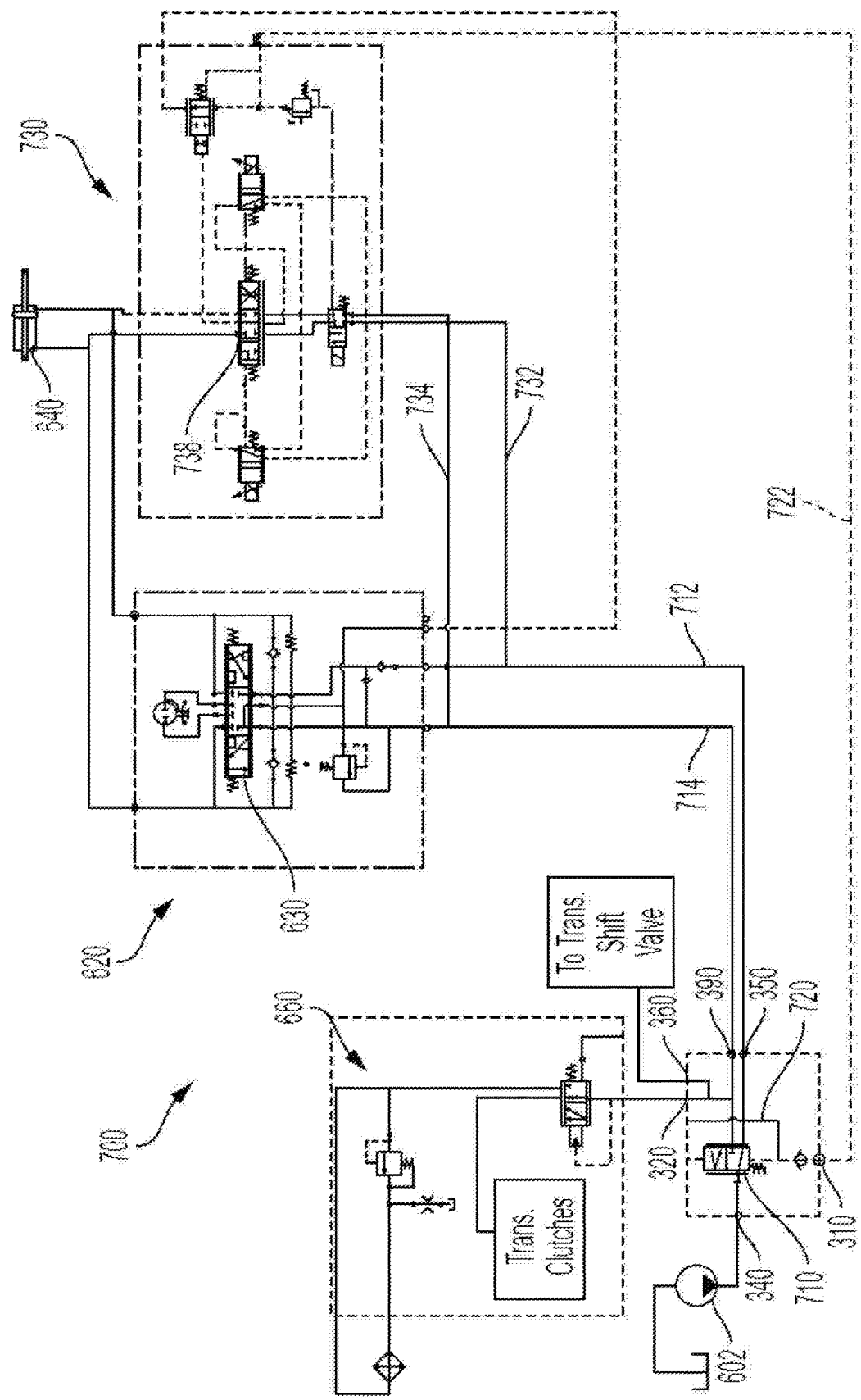
FIG. 9 illustrates an exemplary steering circuit for a vehicle with the OCLS cartridge inserted in the OC-OCLS conversion valve using a priority valve type cartridge.

FIG. 9 illustrates an exemplary steering and transmission hydraulic circuit 700 for the vehicle 100 with the OCLS cartridge 500 inserted in the OC-OCLS conversion valve 230 putting it in the OCLS configuration. The OC-OCLS conversion valve 230 in the OCLS configuration is represented by a two-position priority valve assembly 710 which also includes internal load sense flow paths 720. The steering and transmission hydraulic circuit 700 also includes an automatic driving system 730 that is hydraulically coupled in parallel with the spool steering valve 630 between the OC-OCLS manifold 710 and the steering cylinder 640. The steering and transmission hydraulic circuit 700 in this configuration is using a closed center steering valve 630 and closed center EH steering valve 738 in parallel.

The steering and transmission hydraulic circuit 700 includes the steering pump 602, the manual steering circuit 620, the steering valve 630, the steering cylinder 640 and the transmission control circuit 660. The steering and transmission hydraulic circuit 700 also includes the OC-OCLS conversion valve 710 in the OCLS configuration, the automatic driving system 730, a steering valve supply line 712, a steering valve return line 714, a load sense line 722, an auto-steering supply line 732 and an auto-steering return line 734. The OC-OCLS manifold 710 in this configuration functions as a priority valve between the steering circuits 620, 730 and transmission circuits 660.

When steering is being used, the internal load sense line 720 positions the OC-OCLS priority valve 710 in a first position (shown). This directs flow from the steering pump 602, which enters through the pump supply port 340, to the steering valve supply line 712 connected to the steering supply port 350. The steering valve supply line 712 provides flow to the steering valve 630 of the manual steering circuit 620, and also provides flow through the auto-steering supply line 732 to the automatic driving system 730. Either the steering valve 630 or the automatic driving system 730 controls flow to the steering cylinder 640. The priority valve in the OC-OCLS valve assembly 710 can receive a dynamic load sense signal from either the manual steering circuit 620 or the automatic driving system 730. The dynamic load sense signal from the manual steering circuit 620 can come from a connection point between the internal load sense line 720 and the steering valve supply line 712 in the manifold. The dynamic load sense signal from the automatic driving system 730 can come through load sense line 722. The priority valve 710 does not care which valve it received the load sense signal from. A sensor on the steering column can detect an operator input to the hydro-mechanical steering valve 630 of the manual steering circuit 620 which can override any input to the EH steering valve 738 of the automatic driving system 730. Dynamic load sense can flow at a substantially constant rate (for example about 1 liter per minute (LPM)) through the internal load sense passage 720 via the load sense port 310 through the load sense line 722 to the EH steering valve 738 then to the hydro-mechanical steering valve 630 in series then back through steering return 714. When there is no input from either steering valve 630 or 738, the pressure increasing in the steering valve supply line 712 due to both steering valves 630, 738 being in the closed position shifts the priority valve in the OC-OCLS manifold 710 to the second position bypassing the manual steering circuit 620 and the automatic driving system 730. Blocking the dynamic load sense flow path in either the hydro-mechanical steering valve 630 of the manual steering circuit 620 or the EH steering valve 738 of the automatic driving system 730 causes the priority valve 710 to shift back to the first position. Flow returns from the steering cylinder 640 to either the manual steering circuit 620 or the automatic driving system 730. Return flow through the manual steering circuit 620 returns to the steering valve return line 714, and return flow from the automatic driving system 730 returns through the auto-steering return line 734 and the steering valve return line 714 to the steering return port 390 of the OC-OCLS conversion valve 710. Return flow through the steering return port 390 is directed to the transmission system pressure port 320 and the shift valve supply port 360 which provides flow to the transmission control circuit 660, the transmission shift valve and possibly other downstream consumers.

When steering is not being used. the load sense line 722 is flowing dynamic load sense through both steering valves 630, 738 and back to the steering return line 714. When there is no input from either steering valve 630 or 738, the priority valve in the OC-OCLS manifold 710 moves to the second position which directs flow from the steering pump 602, which enters through the pump supply port 340, to the transmission control circuit 660 and the transmission shift valve through the transmission system pressure port 320 and the shift valve supply port 360. When both steering valves 630, 738 are in the closed position, flow through the steering return line 714 and the steering supply line 712 would be dead headed against the closed steering valves 630, 738 so the flow from the steering pump 602 would be directed only toward the transmission control circuit 660 and the transmission shift valve through the transmission system pressure port 320 and the shift valve supply port 360.

Dynamic load sense, for example flow of 1 LPM, can be used for the steering system to control the priority valve. With the steering valve in the neutral position, the dynamic load sense is routed through both the EH steering valve 738 and hydro-mechanical steering valve 630 to tank allowing the priority valve 710 to shift toward the second position. When dynamic load sense is blocked by the blocker valve in the automatic driving system 730 or by turning the steering wheel connected to the steering valve 630, the dynamic load sense pressure moves the priority valve 710 back toward the first position as pressure rises in the manual steering circuit 620.

Figure 10:
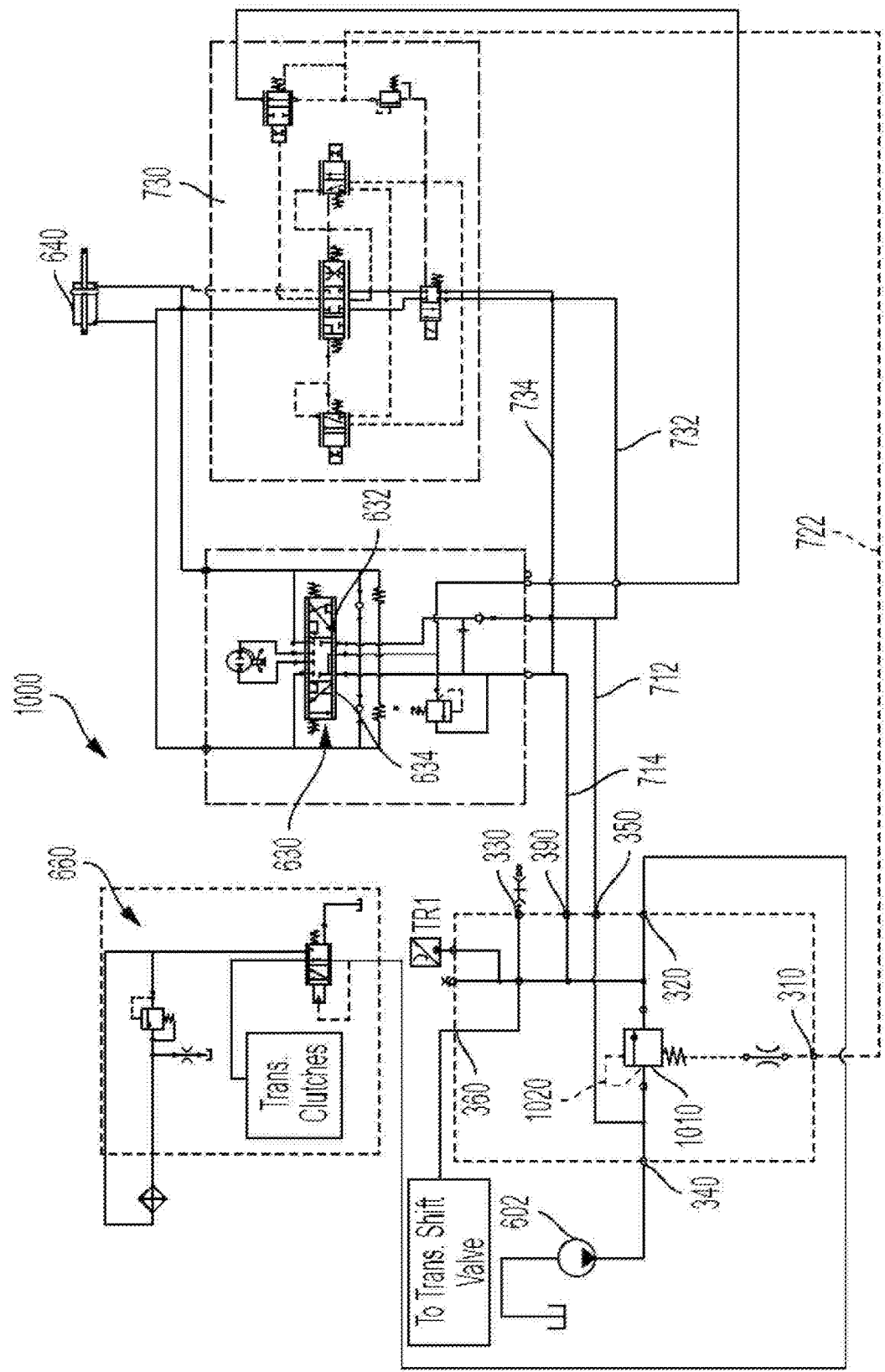
FIG. 10 illustrates an exemplary steering circuit for a vehicle with the OCLS cartridge inserted in the OC-OCLS conversion valve using an unloader valve type cartridge.

FIG. 10 illustrates another exemplary steering and transmission hydraulic circuit 1000 for the vehicle 100 in the OCLS configuration. The OC-OCLS conversion valve 230 in this OCLS configuration is represented by an unloading valve assembly 1010 which also includes internal load sense flow paths 1020. An alternative cartridge is used in the OC-OCLS conversion valve 230 to provide the flow paths described below for the unloading valve assembly 1010. The steering and transmission hydraulic circuit 1000 also includes the automatic driving system 730 that is hydraulically coupled in parallel with the spool steering valve 630 between the OC-OCLS unloading valve 1010 and the steering cylinder 640. The steering and transmission hydraulic circuit 1000 in this configuration is using a closed center steering valve 630 and closed center EH steering valve 738 in parallel. The steering and transmission hydraulic circuit 1000 also includes the steering pump 602, the manual steering circuit 620, the steering valve 630, the steering cylinder 640 and the transmission control circuit 660. The steering and transmission hydraulic circuit 1000 further includes the OC-OCLS conversion valve 1010 in this OCLS configuration, the automatic driving system 730, the steering valve supply line 712, the steering valve return line 714, the load sense line 722, the auto-steering supply line 732 and the auto-steering return line 734. The OC-OCLS manifold 230 in this unloading valve configuration 1010 conceptually provides the same function as with the priority valve configuration 710 allowing manufacturing flexibility. The unloading valve mechanism to route oil to the transmission system pressure port 320 or the steering supply port 350 is slightly simplified, but the ability to convert the hydraulic circuit for an automatic driving system remains the same by using a thread-in cartridge valve.

When steering is being used, the internal load sense line 1020 positions the OC-OCLS unloading valve 1010 in a first position (shown). This directs flow from the steering pump 602, which enters through the pump supply port 340, to the steering valve supply line 712 connected to the steering supply port 350. The steering valve supply line 712 provides flow to the manual steering circuit 620, and also provides flow through the auto-steering supply line 732 to the automatic driving system 730. Either the steering valve 630 or the automatic driving system 730 controls flow to the steering cylinder 640. The OC-OCLS unloading valve 1010 can receive a dynamic load sense signal from either the steering valve 630 of the manual steering circuit 620 or the automatic driving system 730. The dynamic load sense signal from the manual steering circuit 620 can come from a connection point between the internal load sense line 1020 and the steering valve supply line 712 in the manifold. The dynamic load sense signal from the automatic driving system 730 can come through load sense line 722. The unloading valve 1010 does not care which valve it received the load sense signal from. A sensor on the steering column can detect an operator input to the hydro-mechanical steering valve 630 of the manual steering circuit 620 which can override any input to the EH steering valve 738 of the automatic driving system 730. Dynamic load sense can flow at a substantially constant rate (for example about 1 LPM) through the internal load sense passage 1020 via the load sense port 310 through the load sense line 722 to the EH steering valve 738 then to the hydro-mechanical steering valve 630 in series then back through steering return 714. When there is no input from either steering valve 630 or 738, the pressure increasing in the steering valve supply line 712 due to both steering valves 630, 738 being in the closed position shifts the unloading valve 1010 to the second position bypassing the manual steering circuit 620 and the automatic driving system 730. Blocking the dynamic load sense flow path in either the hydro-mechanical steering valve 630 of the manual steering circuit 620 or the EH steering valve 738 of the automatic driving system 730 causes the priority valve 710 to shift back to the first position. Flow returns from the steering cylinder 640 to either the manual steering circuit 620 or the automatic driving system 730. Return flow through the manual steering circuit 620 returns to the steering valve return line 714, and return flow from the automatic driving system 730 returns through the auto-steering return line 734 and the steering valve return line 714 to the steering return port 390 of the unloading valve 1010. Return flow through the steering return port 390 is directed to the transmission system pressure port 320 and the shift valve supply port 360 which provides flow to the transmission control circuit 660, the transmission shift valve and possibly other downstream consumers.

When steering is not being used, the load sense line 722 is flowing dynamic load sense through both steering valves 630, 738 and back to the steering return line 714. When there is no input from either steering valve 630 or 738, the unloading valve 1010 moves to the second position which directs flow from the steering pump 602, which enters through the pump supply port 340, to the transmission control circuit 660 and the transmission shift valve through the transmission system pressure port 320 and the shift valve supply port 360. When both steering valves 630, 738 are in the closed position, flow through the steering return line 714 and the steering supply line 712 would be dead headed against the closed steering valves 630, 738 so the flow from the steering pump 602 would be directed only toward the transmission control circuit 660 and the transmission shift valve through the transmission system pressure port 320 and the shift valve supply port 360.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An open center (OC)-open center load sense (OCLS) conversion valve configured to control flow from a hydraulic pump to first and second hydraulic functions, the OC-OCLS conversion valve comprising:
    a cartridge port configured to hold one of an OC cartridge and an OCLS cartridge;
    a load sense port;
    a pump supply port configured to connect to the hydraulic pump;
    a first function supply port configured to connect to a supply line connected to the first hydraulic function;
    a first function return port configured to connect to a return line connected to the first hydraulic function;
    a first downstream port configured to connect to the second hydraulic function;
    wherein when the OC cartridge is inserted in the cartridge port, regardless of any flow through the load sense port, flow that enters the OC-OCLS conversion valve through the pump supply port is directed to the first function supply port and flow that enters the OC-OCLS conversion valve through the first function return port is directed to the first downstream port;
    when the OCLS cartridge is inserted in the cartridge port and flow through the load sense port indicates a demand from the first hydraulic function, flow that enters the OC-OCLS conversion valve through the pump supply port is directed to the first function supply port and flow that enters the OC-OCLS conversion valve through the first function return port is directed to the first downstream port; and
    when the OCLS cartridge is inserted in the cartridge port and flow through the load sense port does not indicate a demand from the first hydraulic function, flow that enters the OC-OCLS conversion valve through the pump supply port and flow that enters the OC-OCLS conversion valve through the first function return port is directed to the first downstream port.

2. The OC-OCLS conversion valve of claim 1, further comprising at least one additional downstream port, wherein any flow directed to the first downstream port is also directed to the at least one additional downstream port.

3. The OC-OCLS conversion valve of claim 1, further comprising an internal load sense flow path hydraulically connected to the load sense port and the first function supply port.

4. The OC-OCLS conversion valve of claim 1, wherein when the OCLS cartridge is inserted in the cartridge port, the OC-OCLS conversion valve functions as a priority valve.

5. The OC-OCLS conversion valve of claim 1, wherein when the OCLS cartridge is inserted in the cartridge port, the OC-OCLS conversion valve functions as an unloading valve.

6. The OC-OCLS conversion valve of claim 1, wherein:
    when a first OCLS cartridge is inserted in the cartridge port, the OC-OCLS conversion valve functions as a priority valve; and when a second OCLS cartridge is inserted in the cartridge port, the OC-OCLS conversion valve functions as an unloading valve.

7. The OC-OCLS conversion valve of claim 6, wherein the first hydraulic function is a steering circuit and the second hydraulic function is a transmission control circuit.

8. The OC-OCLS conversion valve of claim 7, further comprising an internal load sense flow path hydraulically connected to the load sense port and the first function supply port.

9. The OC-OCLS conversion valve of claim 8, further comprising at least one additional downstream port, wherein any flow directed to the first downstream port is also directed to the at least one additional downstream port.

10. A hydraulic circuit comprising:
a hydraulic pump;
a first hydraulic function;
a second hydraulic function; and
an open center (OC)-open center load sense (OCLS) conversion valve configured to control flow from the hydraulic pump to the first and second hydraulic functions, the OC-OCLS conversion valve comprising:
a cartridge port configured to hold one of an OC cartridge and an OCLS cartridge;
a load sense port configured to connect to a load sense line for the first hydraulic function;
a pump supply port configured to connect to the hydraulic pump;
a first function supply port configured to connect to a supply line for the first hydraulic function;
a first function return port configured to connect to a return line for the first hydraulic function; and
a downstream port configured to connect to a supply line for the second hydraulic function;
wherein when the OC cartridge is inserted in the cartridge port, regardless of any flow through the load sense port, flow that enters the OC-OCLS conversion valve through the pump supply port is directed to the first function supply port and flow that enters the OC-OCLS conversion valve through the first function return port is directed to the downstream port;
when the OCLS cartridge is inserted in the cartridge port and flow through the load sense port indicates a demand from the first hydraulic function, flow that enters the OC-OCLS conversion valve through the pump supply port is directed to the first function supply port and flow that enters the OC-OCLS conversion valve through the first function return port is directed to the downstream port; and
when the OCLS cartridge is inserted in the cartridge port and flow through the load sense port does not indicate a demand from the first hydraulic function, flow that enters the OC-OCLS conversion valve through the pump supply port and flow that enters the OC-OCLS conversion valve through the first function return port is directed to the downstream port.

11. The hydraulic circuit of claim 10, wherein the first hydraulic function is a steering circuit and the second hydraulic function is a transmission control circuit.

12. The hydraulic circuit of claim 11, wherein the steering circuit comprises:
a manual steering circuit; and
an automatic driving system.

13. The hydraulic circuit of claim 12, wherein the steering circuit further comprises:
a steering cylinder;
wherein the manual steering circuit and the automatic driving system are hydraulically coupled in parallel between the OC-OCLS conversion valve and the steering cylinder.

14. The hydraulic circuit of claim of claim 13, wherein the manual steering circuit includes a hydro-mechanical steering valve, and the automatic driving system includes an electrohydraulic steering valve, and the hydro-mechanical steering valve and the electrohydraulic steering valve are hydraulically coupled in parallel between the OC-OCLS conversion valve and the steering cylinder.

15. The hydraulic circuit of claim 13, wherein the OC-OCLS conversion valve further comprises at least one additional downstream port, and any flow directed to the first downstream port is also directed to the at least one additional downstream port.

16. The hydraulic circuit of claim 13, wherein the OC-OCLS conversion valve further comprises an internal load sense flow path hydraulically connected to the load sense port and the first function supply port.

17. The hydraulic circuit of claim 13, wherein when the OCLS cartridge is inserted in the cartridge port of the OC-OCLS conversion valve, the OC-OCLS conversion valve functions as a priority valve.

18. The hydraulic circuit of claim 13, wherein when the OCLS cartridge is inserted in the cartridge port of the OC-OCLS conversion valve, the OC-OCLS conversion valve functions as an unloading valve.

19. The hydraulic circuit of claim 13, wherein:
when a first OCLS cartridge is inserted in the cartridge port of the OC-OCLS conversion valve, the OC-OCLS conversion valve functions as a priority valve; and
when a second OCLS cartridge is inserted in the cartridge port of the OC-OCLS conversion valve, the OC-OCLS conversion valve functions as an unloading valve.

20. The hydraulic circuit of claim 19, wherein the OC-OCLS conversion valve further comprises an internal load sense flow path hydraulically connected to the load sense port and the first function supply port.

* * * * *